US008195370B2

(12) United States Patent
Simon, Jr. et al.

(10) Patent No.: US 8,195,370 B2
(45) Date of Patent: Jun. 5, 2012

(54) ASSOCIATION OF TORQUE REQUESTING MODULES IN A COORDINATED TORQUE ARCHITECTURE

(75) Inventors: Robert C. Simon, Jr., Brighton, MI (US); Leonard G. Wozniak, Ann Arbor, MI (US); Michael Livshiz, Ann Arbor, MI (US); Christopher E. Whitney, Highland, MI (US); Charles H. Folkerts, Troy, MI (US); Scott J. Chynoweth, Davison, MI (US); David J. Stroh, Columbus, IN (US)

(73) Assignee: GM Global Technology Operations LLC

( * ) Notice: Subject to any disclaimer, the term of this patent is extended or adjusted under 35 U.S.C. 154(b) by 1250 days.

(21) Appl. No.: 11/934,234

(22) Filed: Nov. 2, 2007

(65) Prior Publication Data

US 2009/0024263 A1 Jan. 22, 2009

Related U.S. Application Data

(60) Provisional application No. 60/959,697, filed on Jul. 16, 2007.

(51) Int. Cl.
*B60L 15/20* (2006.01)

(52) U.S. Cl. ............................................ 701/54; 701/84

(58) Field of Classification Search ..................... 701/54
See application file for complete search history.

(56) References Cited

U.S. PATENT DOCUMENTS

| | | | | | |
|---|---|---|---|---|---|
| 5,019,989 | A | * | 5/1991 | Ueda et al. | 701/104 |
| 5,073,865 | A | * | 12/1991 | Togai et al. | 701/103 |
| 5,272,939 | A | * | 12/1993 | Markyvech et al. | 477/120 |
| 5,573,476 | A | * | 11/1996 | Minowa et al. | 477/109 |
| 5,625,558 | A | * | 4/1997 | Togai et al. | 701/93 |
| 5,772,555 | A | * | 6/1998 | Minowa et al. | 477/109 |
| 5,776,030 | A | * | 7/1998 | Minowa et al. | 477/109 |
| 5,779,594 | A | * | 7/1998 | Minowa et al. | 477/156 |

(Continued)

FOREIGN PATENT DOCUMENTS

CN 1088520 A 6/1994

(Continued)

OTHER PUBLICATIONS

Chinese Office Action for CN Serial No. CN200810149762.2 dated Nov. 3, 2010; 5 pages.

*Primary Examiner* — Shelley Chen

(57) ABSTRACT

A powertrain control system for a vehicle includes a plurality of axle torque request modules that generate respective axle torque requests based on respective performance criteria of a vehicle, an axle torque arbitration module that generates a net axle torque request based on the plurality of axle torque requests, a plurality of propulsion torque request modules that generate respective propulsion torque requests based on respective performance criteria of an engine of the vehicle, a propulsion torque arbitration module that determines a net engine torque request based on the net axle torque request and the plurality of propulsion torque requests, and a propulsion torque control module that controls a plurality of actuators based on the net engine torque request such that the engine produces an output torque in accordance with the net engine torque request.

26 Claims, 3 Drawing Sheets

U.S. PATENT DOCUMENTS

| | | | | |
|---|---|---|---|---|
| 5,792,021 | A * | 8/1998 | Minowa et al. | 477/106 |
| 6,090,011 | A * | 7/2000 | Minowa et al. | 477/107 |
| 6,466,851 | B2 * | 10/2002 | Kato et al. | 701/51 |
| 7,704,185 | B2 * | 4/2010 | Babcock et al. | 477/3 |
| 7,801,658 | B2 | 9/2010 | Ohshima | |
| 2001/0056320 | A1 * | 12/2001 | Kato et al. | 701/51 |
| 2003/0097215 | A1 * | 5/2003 | Riedle et al. | 701/110 |
| 2004/0034460 | A1 | 2/2004 | Folkerts et al. | |
| 2006/0173602 | A1 * | 8/2006 | Graf et al. | 701/54 |
| 2007/0067087 | A1 * | 3/2007 | Ohshima | 701/93 |
| 2009/0182478 | A1 * | 7/2009 | Whitney et al. | 701/93 |

FOREIGN PATENT DOCUMENTS

| | | | |
|---|---|---|---|
| CN | 1923557 | A | 3/2007 |
| CN | 101450629 | A | 6/2009 |
| DE | 102006000431 | | 3/2007 |
| DE | 102008039574 | | 6/2009 |
| EP | 0578399 | A2 | 1/1994 |
| IN | 1495/KOL/2008 | | 1/2008 |
| JP | 2003048461 | A * | 2/2003 |

* cited by examiner

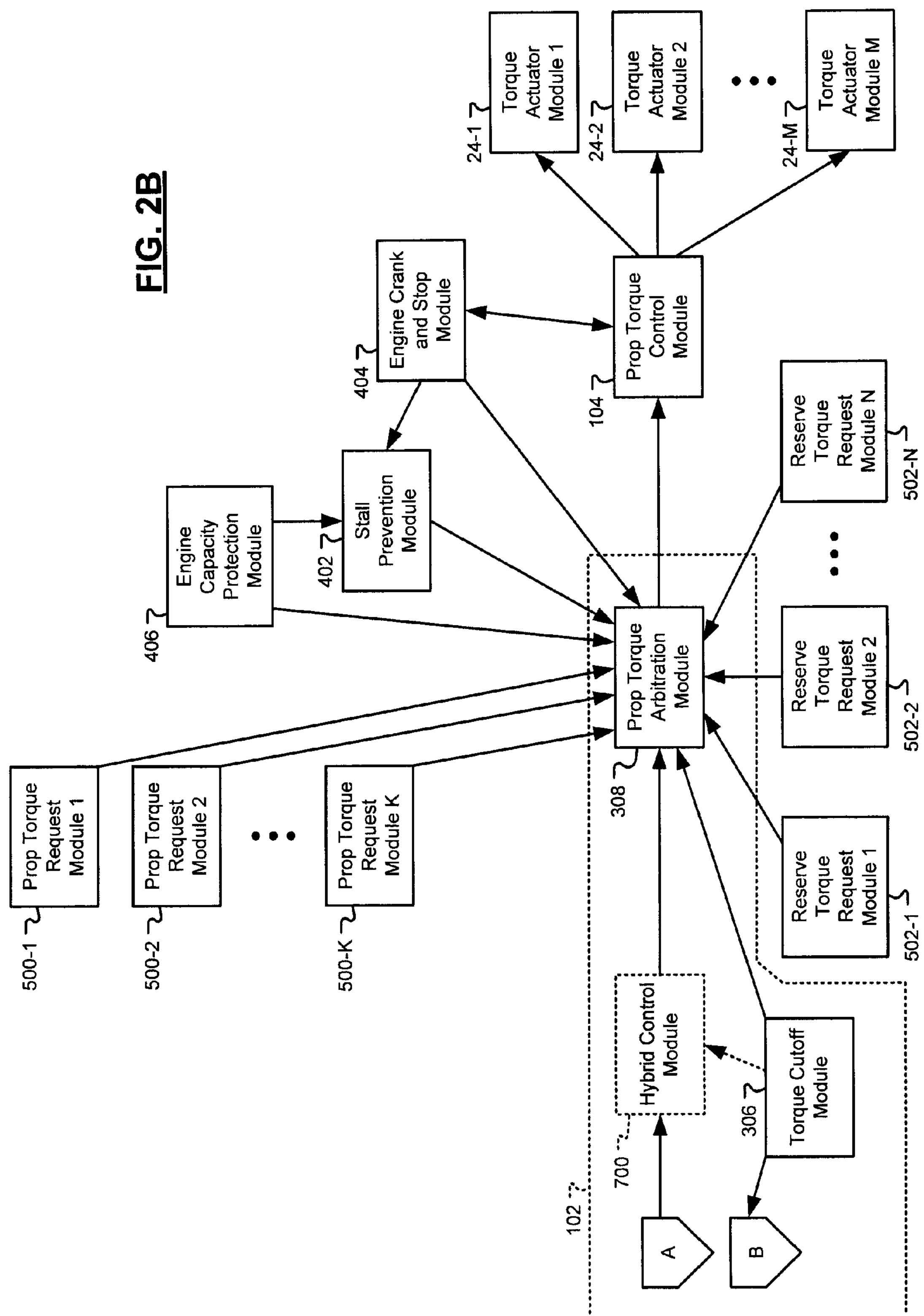
FIG. 2B
Torque Actuator Module 1
Torque Actuator Module 2
Torque Actuator Module M
24-1
24-2
24-M
Engine Crank and Stop Module
404
Prop Torque Control Module
104
Engine Capacity Protection Module
406
Stall Prevention Module
402
Reserve Torque Request Module N
502-N
Reserve Torque Request Module 2
502-2
Reserve Torque Request Module 1
502-1
Prop Torque Arbitration Module
308
Prop Torque Request Module 1
500-1
Prop Torque Request Module 2
500-2
Prop Torque Request Module K
500-K
Hybrid Control Module
700
Torque Cutoff Module
306
102
A
B

ASSOCIATION OF TORQUE REQUESTING MODULES IN A COORDINATED TORQUE ARCHITECTURE

CROSS-REFERENCE TO RELATED APPLICATIONS

This application claims the benefit of U.S. Provisional Application No. 60/959,697, filed on Jul. 16, 2007. The disclosure of the above application is incorporated herein by reference.

FIELD

The present disclosure relates to coordinating torque requests between a plurality of torque requesting modules and a plurality of actuators that affect torque in a vehicle powertrain.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Powertrain control systems include a plurality of modules that require a certain amount of engine torque to operate properly. For example, an automatic transmission control module may need to momentarily reduce torque from the engine in order to change transmission gears. Another example may be an air conditioning clutch control module that needs engine torque to be increased a moment prior to engaging an air conditioning compressor clutch. The engine torque increase helps maintain a constant engine speed when the compressor clutch engages, particularly when the engine is idling.

In the prior art these various modules affect torque actuators directly. For example, the automatic transmission control module may retard a spark advance to the engine to reduce the engine torque during the shift. Similarly, the air conditioning clutch control module may increase the spark advance to increase the engine torque during the moment prior to engaging the compressor clutch.

As vehicle powertrain systems include more modules and more actuators that affect torque, the architecture of the prior art becomes cumbersome to maintain and undesirably difficult to troubleshoot. As an example of more actuators, hybrid vehicles include an engine and an electric motor that provide torque. Integrating the hybrid vehicle powertrain to existing torque-modifying modules can be undesirably cumbersome with the existing powertrain control architecture.

SUMMARY

A powertrain control system for a vehicle includes a plurality of axle torque request modules that generate respective axle torque requests based on respective performance criteria of a vehicle, an axle torque arbitration module that generates a net axle torque request based on the plurality of axle torque requests, a plurality of propulsion torque request modules that generate respective propulsion torque requests based on respective performance criteria of an engine of the vehicle, a propulsion torque arbitration module that determines a net engine torque request based on the net axle torque request and the plurality of propulsion torque requests, and a propulsion torque control module that controls a plurality of actuators based on the net engine torque request such that the engine produces an output torque in accordance with the net engine torque request.

In other features an axle-to-propulsion torque conversion module converts the net axle torque request to a propulsion torque request based on at least one of an axle gear ratio, a tire diameter, and a transmission gear ratio. The plurality of axle torque request modules includes a cruise control torque request module that generates one of the axle torque requests based on a cruise control set speed of the vehicle. An adaptive cruise control torque request module communicates an axle torque correction to the cruise control request module based on an environment of the vehicle. The plurality of axle torque request modules includes a traction/drag control module that generates one of the axle torque requests based on slip between a tire of the vehicle and a road surface. The plurality of axle torque request modules includes a vehicle over-speed protection module that generates one of the axle torque requests based on a predetermined speed limit of the vehicle. The plurality of axle torque request modules includes a brake torque management module that generates one of the axle torque requests based on brake torque that is provided by brakes of the vehicle.

In other features the plurality of propulsion torque request modules includes a stall prevention module that generates one of the propulsion torque requests based on a minimum torque that is needed to keep the engine running. The plurality of propulsion torque request modules includes an engine crank and stop module that generates one of the propulsion torque requests based on whether the engine is newly assembled. The plurality of propulsion torque request modules includes an engine capacity protection module that generates one of the propulsion torque requests based on a predetermined catalyst temperature limit. The plurality of propulsion torque request modules includes a transmission torque request module that generates one of the propulsion torque requests based on transmission gear shifts. The plurality of propulsion torque request modules includes an engine over-speed protection module that generates one of the propulsion torque requests based on a predetermined maximum engine RPM. The plurality of propulsion torque request modules includes an engine idle speed control that generates one of the propulsion torque requests based on a desired idle speed for the engine. The plurality of propulsion torque request modules include reserve torque request modules that generate respective ones of the propulsion torque requests based on torque that will be needed from the engine to compensate for an impending load change on the engine. The reserve torque request modules include an air conditioning compressor torque compensation module that generates a respective one of the propulsion torque requests based on torque that will be needed from the engine to compensate for an impending load change due to an air conditioning compressor clutch engaging and disengaging. The reserve torque request modules include a catalyst light off module that generates a respective one of the propulsion torque requests to change an exhaust gas temperature of the engine.

In other features the vehicle is a gasoline/electric hybrid vehicle and the powertrain control system further comprises a hybrid control module that that determines how much torque of the net axle torque request is to be provided by an electric motor.

A method of operating a powertrain control system for a vehicle includes generating axle torque requests based on respective performance criteria of a vehicle, generating a net axle torque request based on the axle torque requests, generating propulsion torque requests based on respective performance criteria of an engine of the vehicle, determining a net engine torque request based on the net axle torque request and the propulsion torque requests, and controlling a plurality of actuators based on the net engine torque request such that an engine produces an output torque in accordance with the net engine torque request.

In other features the method includes converting the net axle torque request to a propulsion torque request based on at least one of an axle gear ratio, a tire diameter, and a transmission gear ratio. One of the axle torque requests is based on a cruise control set speed of the vehicle. The method includes modifying the axle torque request based on an environment of the vehicle. One of the axle torque requests is based on wheel slip between a tire of the vehicle and a road surface. One of the axle torque requests is based on a predetermined speed limit of the vehicle. One of the axle torque requests is based on brake torque that is provided by brakes of the vehicle.

In other features one of the propulsion torque requests is based on a minimum torque that is needed to keep the engine running. One of the propulsion torque requests is based on whether the engine is newly assembled. One of the propulsion torque requests is based on a predetermined catalyst temperature limit. One of the propulsion torque requests is based on transmission gear shifts. One of the propulsion torque requests is based on a predetermined maximum engine RPM. One of the propulsion torque requests based on a desired idle speed for the engine. One of the propulsion torque requests is based on torque that will be needed from the engine to compensate for an impending load change on the engine. One of the propulsion torque requests is based on torque that will be needed from the engine to compensate for an impending load change on the engine due to an air conditioning compressor clutch engaging and disengaging. One of the propulsion torque requests is based on increasing an exhaust gas temperature to warm a catalyst to a catalyst light off temperature.

In other features the method includes determining how much torque of the net axle torque request is to be provided by an electric motor of a hybrid powertrain.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A and 2B are a functional block diagram of a coordinated torque control system for the vehicle powertrain.

DETAILED DESCRIPTION

Figure 1:
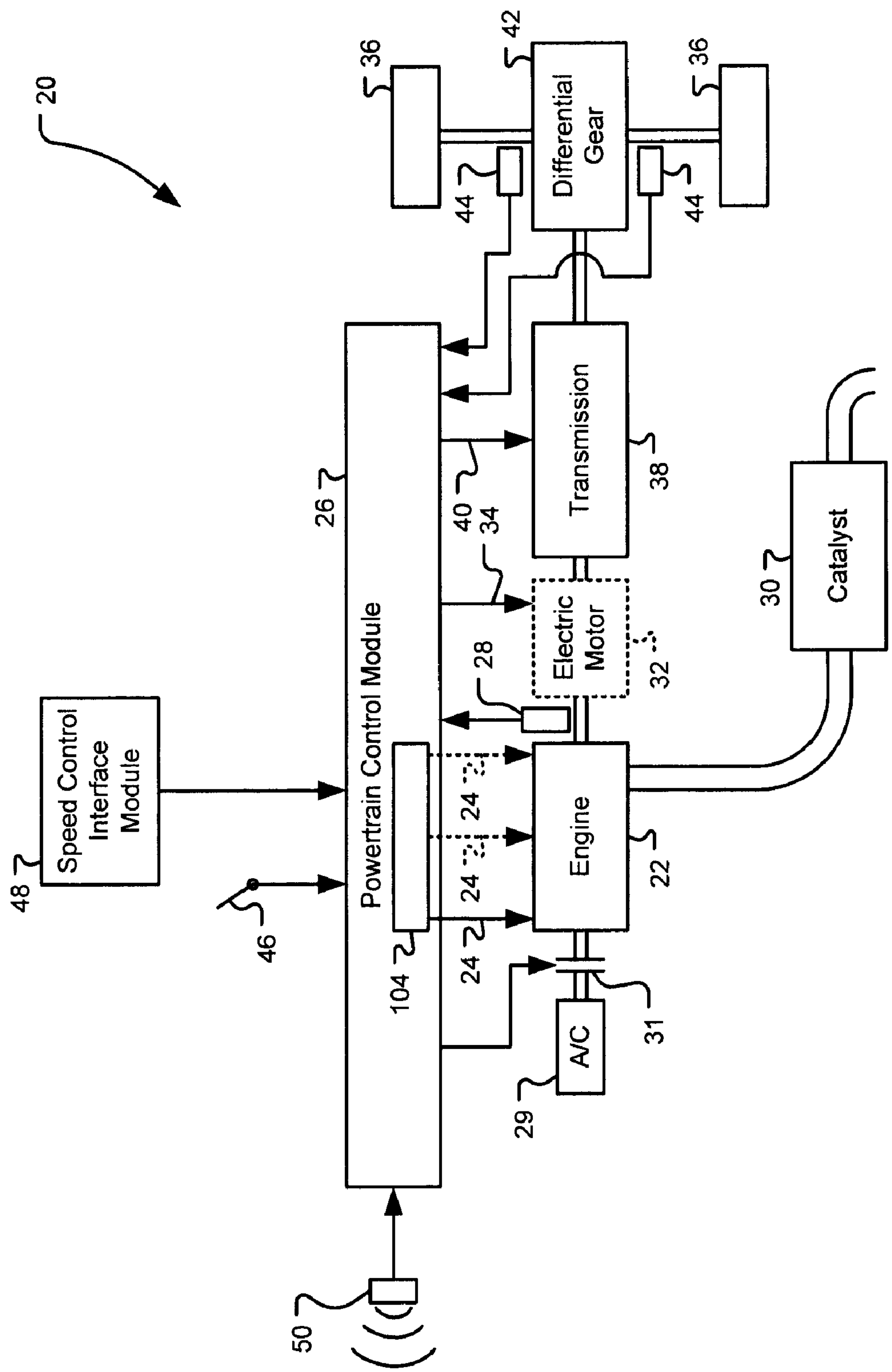
FIG. 1 is a functional block diagram of a vehicle powertrain.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram is shown of a vehicle powertrain 20. Powertrain 20 includes an internal combustion engine 22 that develops torque. The amount of torque is established by one or more actuators 24 that control at least one of fuel, ignition, residual exhaust gas or exhaust recirculation (EGR), number of cylinders firing, and air flow, to engine 22 in accordance with commands from a powertrain control module (PCM) 26. It should be appreciated that engine 22 may be a diesel engine, in which case ignition and air flow are not controlled by PCM 26; however, the fuel amount, injection timing, residual exhaust gas or EGR, and turbo boost could be controlled to control the amount of torque. For example, EGR and boost control the air flow indirectly by displacing air with exhaust gas in a cylinder charge. A crankshaft position sensor 28 generates a signal that indicates a speed of engine 22. Exhaust from engine 22 passes through a catalyst 30. Torque from engine 22 can be used for driving accessory loads. An air conditioning compressor 29 is an example of an accessory load. PCM 26 can employ a compressor clutch 31 to selectively couple and decouple air conditioning compressor 29 from the engine torque. Other examples of accessory loads include an alternator, a power steering pump, an air pump, and the like.

Powertrain 20 may also include an electric motor 32 that provides torque in accordance with a torque command 34. The torque of electric motor 32 can be combined with the torque of engine 22 to provide power for powertrain 20. While electric motor 32 is shown coupled in series with the torque output of engine 22, it should be appreciated that other configurations are also contemplated to be within the scope of this description. For example, electric motor 32 may be implemented as one or more electric motors that provide torque directly to wheels 36 instead of passing through a transmission 38.

The combined torque of engine 22 and electric motor 32 is applied to an input of transmission 38. Transmission 38 may be an automatic transmission that switches gears in accordance with a gear change command 40 from PCM 26. An output shaft of transmission 38 is coupled to an input of a differential gear 42. Differential gear 42 drives axles and wheels 36. Wheel speed sensors 44 generate signals that indicate a rotation speed of their respective wheels 36.

PCM 26 receives an accelerator pedal position signal from a pedal position sensor 46. PCM 26 also receives a set speed signal from a cruise or speed control interface module 48. An adaptive cruise control sensor 50 senses vehicles or other obstacles that are in a driving path and generates a signal that indicates a distance to the obstacles. The signal can be used to adjust a set speed that is provided via speed control interface module 48.

Figure 2A:
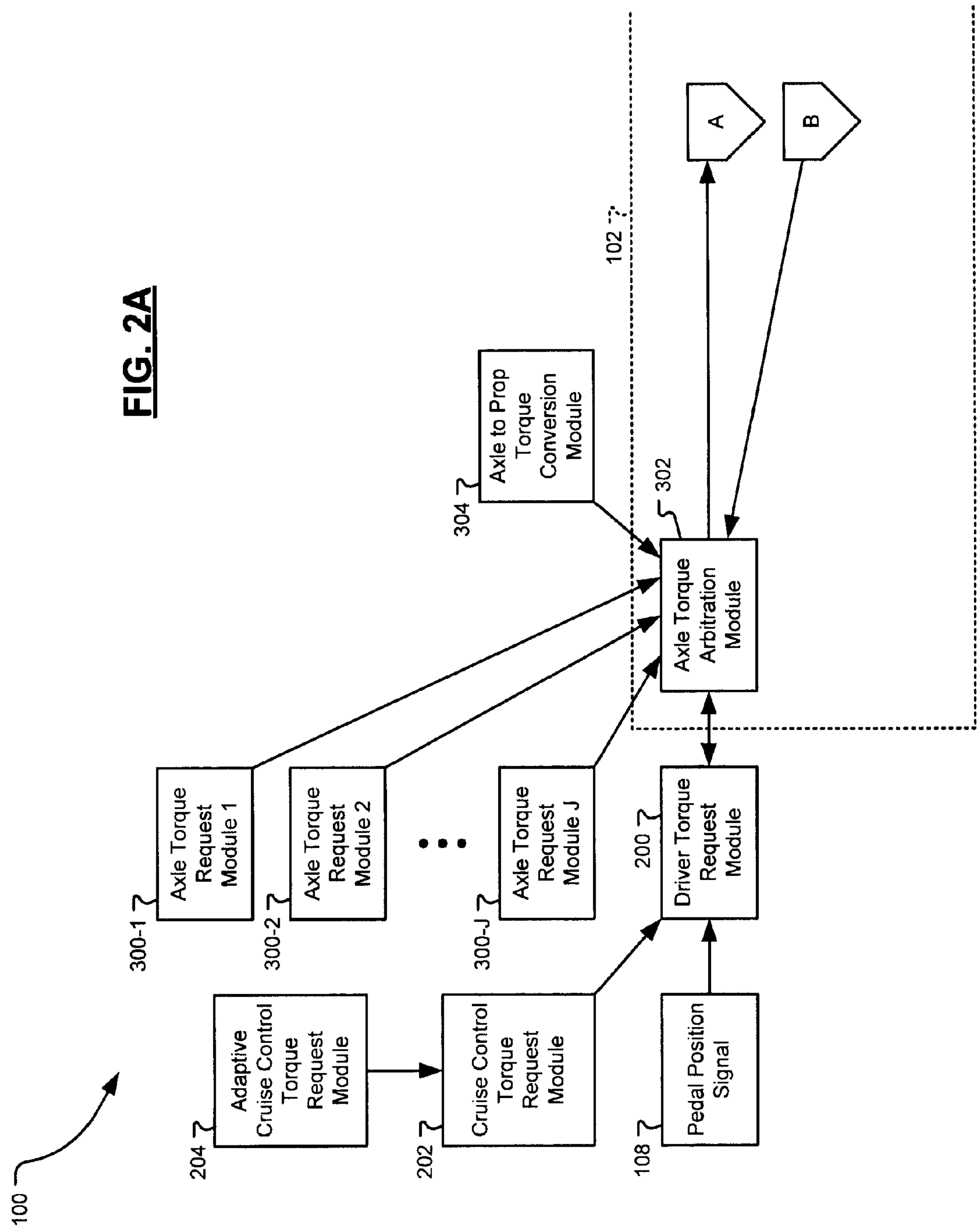

Referring now FIGS. 2A and 2B, a functional block diagram is shown of a coordinated torque control system 100. Coordinated torque control system 100 can be implemented with PCM 26. FIGS. 2A and 2B join together to depict the complete functional block diagram. A first connector label "A" on FIG. 2A overlays a second connector label "A" on FIG. 2B. A first connector label "B" on FIG. 2A overlays a second connector label "B" on FIG. 2B. FIGS. 2A and 2B are collectively referred to as FIG. 2.

Coordinated torque control system 100 employs a torque request backbone module 102 that determines a propulsion torque demand and communicates the propulsion torque demand to a propulsion torque control module 104. Torque request backbone module 102 determines the propulsion torque demand based on inputs from a plurality of torque requesting modules that are described below in more detail. The torque requesting modules include modules that want to affect one or more of actuators 24 to affect the engine torque. The propulsion torque demand represents the torque needed from engine 22 in order to satisfy the needs of the torque requesting modules such that they can carry out their respective control strategies.

Propulsion torque control module 104 controls one or more of actuators 24-1, . . . , 24-M, i.e. actuators 24, based on the net propulsion torque demand. Actuators 24 affect the engine torque. Examples of actuators 24 include an ignition module that delivers an ignition spark to the engine at a specified ignition timing, a fuel injection module that delivers a specified amount of fuel to the engine at a specified time, an electronic throttle control module that moves a throttle valve to a specified opening, and the like.

Each torque requesting module is categorized as either an axle torque requesting module or a propulsion torque requesting module. Axle torque requesting modules control at least one of vehicle speed and vehicle traction with the road surface. Propulsion torque requesting modules control the output torque of the engine and electric motor 32. The axle torque requesting modules are shown in FIG. 2A and will now be described in more detail.

A pedal position signal 108 represents a vehicle acceleration requested by the vehicle operator. Pedal position signal 108 may be generated by pedal position sensor 46. A driver torque request module 200 generates a driver torque request based on pedal position signal 108. The driver torque request represents the axle torque needed to accelerate the vehicle in accordance with at least one of pedal position signal 108, engine speed signal 28, and vehicle speed signal 44.

A cruise control torque request module 202 generates a cruise control torque request. The cruise control torque request represents an axle torque that is needed to maintain the vehicle at the set speed indicated via interface module 48. An adaptive cruise control torque request module 204 may communicate with cruise control torque request module 202 to modify the cruise control torque request based on the environment surrounding the vehicle. For example, adaptive cruise control torque request module 204 may request that the axle torque be reduced so that the vehicle decelerates and/or maintains at least a minimum following distance behind a second vehicle while the cruise control is active. An actual following distance can be indicated by the signal from adaptive cruise control sensor 50.

Other axle torque requesting modules are represented by axle torque request modules 300-1, . . . , 300-J, referred to collectively as axle torque request modules 300. A first example of an axle torque request module 300 is a traction/drag control module. The traction/drag control module determines axle torque changes needed to control positive wheel slip and negative wheel slip. Positive wheel slip refers to slip between a vehicle tire and the road surface due to excessive powertrain torque during acceleration. Negative wheel slip refers to slip between the vehicle tire and the road surface due to excessive braking axle torque during deceleration. The slip can be detected based on the signals from wheel speed sensors 44.

A second example of an axle torque request module 300 is a vehicle over-speed protection module. The vehicle over-speed protection module determines a maximum axle torque limit in order to keep the vehicle speed below a predetermined speed limit.

A third example of an axle torque request module 300 is a brake torque management module. The brake torque management module determines a maximum axle torque when the vehicle brakes are applied. The maximum axle torque prevents the axle torque from overcoming the brake torque of the vehicle brakes.

A fourth example of an axle torque request module 300 is a stability control module. The stability control module generates axle torque requests based on a yaw rate of the vehicle. A stability control module may be included in an electronic stability control system, such as the StabiliTrak system sold by General Motors.

Torque control backbone module 102 includes an axle torque arbitration module 302 that receives the various torque requests and/or limits from driver torque request module 200, cruise control torque request module 202, axle torque request modules 300, and a torque cutoff control module 306 (shown in FIG. 2B). Torque cutoff control module 306 is described further below. Axle torque arbitration module 302 generates a net axle torque request based on the torque requests and/or limits and communicates the net axle torque request to an axle-to-propulsion torque conversion module 304. Axle-to-propulsion torque conversion module 304 converts the net axle torque request to a corresponding propulsion torque request based on at least one of the gear ratios in the axle differential gear 42, diameter of wheels 36, a gear ratio of transmission 38, and torque converter gain. Axle torque arbitration module 302 communicates the corresponding propulsion torque request to a propulsion torque arbitration module 308 that is included in torque control backbone 102.

Discussion will now move to the various propulsion torque requesting modules which are shown in FIG. 2B. A stall prevention module 402 determines a minimum torque needed to keep engine 22 running. Stall prevention module 402 may increase the minimum torque based on input from at least one of an engine crank and stop module 404 and an engine capacity protection module 406. Engine crank and stop module 404 increases the minimum torque request based on whether the engine is a new or green engine. A green requires a greater fuel injection pulse width to purge air from the fuel system when the vehicle is first assembled. To compensate for the increased fuel injection pulse width, engine crank and stop module 404 may also communicate with propulsion torque control module 104 so that it may retard the ignition timing and maintain the engine torque constant despite the increased fuel injector pulse width. Engine capacity protection module 406 provides a maximum torque limit for engine 22 based on mechanical limitations of powertrain 20. Examples of limitations include maximum torque limit of transmission 38, a maximum temperature limit of catalyst 30, and the like.

Propulsion torque arbitration module 308 also receives propulsion torque requests from one or more other propulsion torque request modules 500-1, . . . , 500-K, referred to collectively as propulsion torque request modules 500. An example of a propulsion torque request module 500 includes a transmission torque request module that generates a torque request to reduce the engine torque during transmission shifts. Other propulsion torque request modules 500 can include at least one of an engine over-speed protection module and an engine idle speed control module. The engine over-speed protection module determines a propulsion torque limit to prevent the engine speed or RPM from exceeding a predetermined engine speed. The engine speed can be determined based on the signal from crankshaft position sensor 28. The engine idle speed control module determines the propulsion torque needed to maintain engine 22 at a predetermined idle speed during coasting or at idle with transmission in 38 in drive or neutral.

Propulsion torque arbitration module 308 also receives reserve torque requests from one or more reserve torque request modules 502-1, . . . , 502-N, referred to collectively as reserve torque request modules 502. Reserve torque refers to torque that will be needed from engine 22 in the future. A first example of a reserve torque request module 502 is an air conditioning compressor torque compensation module. The air conditioning compressor torque compensation module requests a reserve torque so that the engine speed remains fairly constant when compressor clutch 31 engages and disengages.

A second example of a reserve torque request module 502 is a catalyst light-off module. When the engine is started cold the catalyst light-off module requests that the engine spark be retarded to increase the exhaust gas temperature and thereby heat catalyst 30 to its conversion temperature. To compensate for the torque loss that is caused by the retarded spark the catalyst light-off module can also request that the throttle opening be increased while the spark is retarded.

A third example of a reserve torque request module 502 is an intrusive diagnostic module. An intrusive diagnostic, such as an idle catalyst monitor, needs to change the air/fuel ratio of the engine to perform a diagnostic module. The intrusive diagnostic module therefore requests reserve torque to compensate for the torque effect of a diagnostic procedure that is about to execute.

In some situations the propulsion torque needs to be minimized by momentarily turning off fuel and/or spark to the engine. Torque cutoff module 306 generates the torque requests for these situations, which can include at least one of a clutch fuel cutoff and a deceleration fuel cutoff. A clutch fuel cutoff occurs when the vehicle is equipped with a manual transmission and the vehicle operator disengages the clutch. The clutch fuel cutoff prevents the engine speed from flaring beyond a predetermined speed when the clutch disengages and removes a load from the engine. The deceleration fuel cutoff occurs when the vehicle is coasting above a predetermined speed. The deceleration fuel cutoff helps increase engine braking. Deceleration fuel cutoffs are also communicated to axle torque arbitration module 302.

Propulsion torque arbitration module 308 generates a total requested propulsion torque based on the torque requests and/or limits from the various propulsion torque request modules and the axle torque arbitration module. Propulsion torque arbitration module 308 communicates the total requested propulsion torque to propulsion torque control module 104.

Torque control backbone 102 may also be configured to use with a hybrid electric vehicle. A hybrid electric vehicle includes engine 22 and electric motor 32, which cooperate to propel the vehicle. In a hybrid electric vehicle, the total axle torque request from axle torque arbitration module 302 is communicated to a hybrid control module 700. Hybrid control module 700 determines how much propulsion torque will be provided by electric motor 32 and how much will be provided by engine 22. Hybrid control module 700 communicates the engine's share of the propulsion torque to propulsion torque arbitration module 308. The electric motor's share of the propulsion torque is communicated to electric motor 32 via torque command 34. Axle to propulsion torque conversion module 304 may be combined with hybrid control module 700. Also, torque cutoff module 306 may communicate deceleration fuel cutoff torque requests to hybrid control module 700 instead of axle torque arbitration module 302.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A powertrain control system for a vehicle, comprising:
- a plurality of axle torque request modules that generate respective axle torque requests based on respective performance criteria of a vehicle;
- an axle torque arbitration module that generates a net axle torque request based on the plurality of axle torque requests;
- an axle-to-propulsion torque conversion module that converts the net axle torque request into a first propulsion torque request based on an axle gear ratio, a tire diameter, a transmission gear ratio, and a torque converter gain;
- a plurality of propulsion torque request modules that generate respective propulsion torque requests based on respective performance criteria of an engine of the vehicle;
- a propulsion torque arbitration module that determines a net engine torque request based on the first propulsion torque request and the plurality of propulsion torque requests; and
- a propulsion torque control module that controls a plurality of actuators based on the net engine torque request such that the engine produces an output torque in accordance with the net engine torque request.

2. The powertrain control system of claim 1 wherein the plurality of axle torque request modules includes a cruise control torque request module that generates one of the axle torque requests based on a cruise control set speed of the vehicle.

3. The powertrain control system of claim 2 further comprising an adaptive cruise control torque request module that communicates an axle torque correction to the cruise control request module based on an environment of the vehicle.

4. The powertrain control system of claim 1 wherein the plurality of axle torque request modules includes a traction/drag control module that generates one of the axle torque requests based on slip between a tire of the vehicle and a road surface.

5. The powertrain control system of claim 1 wherein the plurality of axle torque request modules includes a vehicle over-speed protection module that generates one of the axle torque requests based on a predetermined speed limit of the vehicle.

6. The powertrain control system of claim 1 wherein the plurality of axle torque request modules includes at least one of a brake torque management module that generates one of the axle torque requests based on brake torque that is provided by brakes of the vehicle and a stability control module that generates one of the axle torque requests based on a yaw rate of the vehicle.

7. The powertrain control system of claim 1 wherein the plurality of propulsion torque request modules includes a stall prevention module that generates one of the propulsion torque requests based on a minimum torque that is needed to keep the engine running.

8. The powertrain control system of claim 1 wherein the plurality of propulsion torque request modules includes an engine crank and stop module that generates one of the propulsion torque requests based on whether the engine is newly assembled.

9. The powertrain control system of claim 1 wherein the plurality of propulsion torque request modules includes an engine capacity protection module that generates one of the propulsion torque requests based on a predetermined catalyst temperature limit.

10. The powertrain control system of claim 1 wherein the plurality of propulsion torque request modules includes a transmission torque request module that generates one of the propulsion torque requests based on transmission gear shifts.

11. The powertrain control system of claim 1 wherein the plurality of propulsion torque request modules includes a engine over-speed protection module that generates one of the propulsion torque requests based on a predetermined maximum engine RPM.

12. The powertrain control system of claim 1 wherein the plurality of propulsion torque request modules includes an engine idle speed control that generates one of the propulsion torque requests based on a desired idle speed for the engine.

13. The powertrain control system of claim 1 wherein the plurality of propulsion torque request modules include reserve torque request modules that generate respective ones of the propulsion torque requests based on torque that will be needed from the engine to compensate for an impending load change on the engine.

14. The powertrain control system of claim 13 wherein the reserve torque request modules include an air conditioning compressor torque compensation module that generates a respective one of the propulsion torque requests based on torque that will be needed from the engine to compensate for an impending load change due to an air conditioning compressor clutch engaging and disengaging.

15. The powertrain control system of claim 13 wherein the reserve torque request modules include a catalyst light off module that generates a respective one of the propulsion torque requests to change an exhaust gas temperature of the engine.

16. The powertrain control system of claim 1 wherein the vehicle is a gasoline/electric hybrid vehicle and the powertrain control system further comprises a hybrid control module that that determines how much torque of the net axle torque request is to be provided by an electric motor.

17. A method of operating a powertrain control system for a vehicle, comprising:

generating a plurality of axle torque requests based on respective performance criteria of a vehicle;

generating a net axle torque request based on the axle torque requests;

converting the net axle torque request into a first propulsion torque request based on an axle gear ratio, a tire diameter, a transmission gear ratio, and a torque converter gain;

generating a plurality of propulsion torque requests based on respective performance criteria of an engine of the vehicle;

determining a net engine torque request based on the first propulsion torque request and the propulsion torque requests; and controlling a plurality of actuators based on the net engine torque request such that an engine produces an output torque in accordance with the net engine torque request.

18. The method of claim 17 wherein one of the propulsion torque requests is based on a predetermined catalyst temperature limit.

19. The method of claim 17 wherein one of the propulsion torque requests is based on transmission gear shifts.

20. The method of claim 17 wherein one of the propulsion torque requests is based on a predetermined maximum engine RPM.

21. The method of claim 17 wherein at least one of the propulsion torque requests is based on torque that will be needed from the engine to compensate for an impending load change on the engine.

22. The method of claim 17 further comprising determining how much torque of the net axle torque request is to be provided by an electric motor.

23. The method of claim 17 wherein one of the axle torque requests is generated based on a cruise control set speed of the vehicle.

24. The method of claim 17 further comprising generating an axle torque correction based on an environment of the vehicle, wherein the one of the axle torque requests generated further based on the axle torque correction.

25. The method of claim 21 wherein the at least one of the propulsion torque requests is generated based on torque that will be needed from the engine to compensate for an impending load change due to an air conditioning compressor clutch engaging and disengaging.

26. The method of claim 21 wherein the at least one of the propulsion torque requests is generated to change an exhaust gas temperature of the engine.

* * * * *